United States Patent Office 3,008,588
Patented Nov. 14, 1961

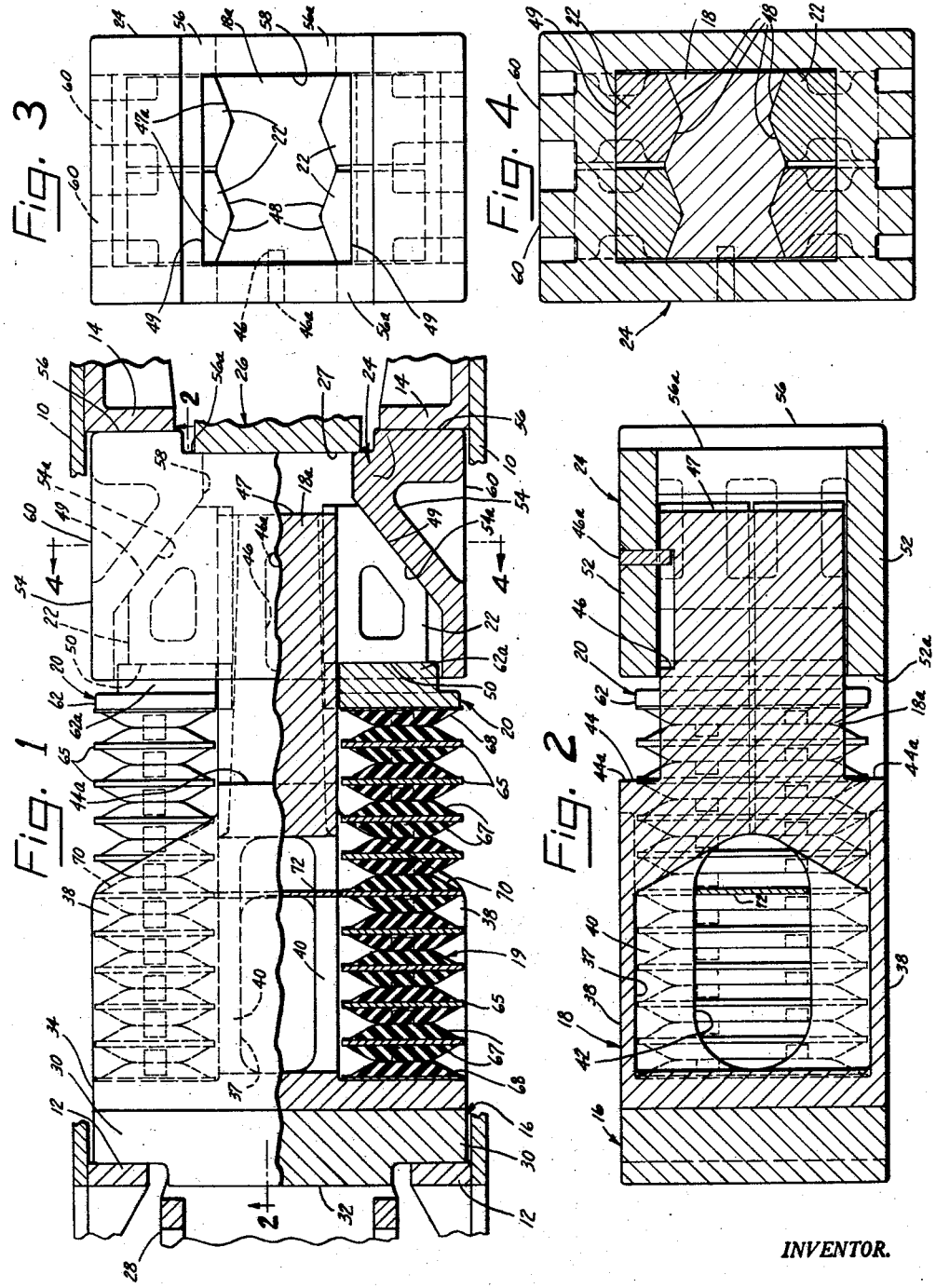

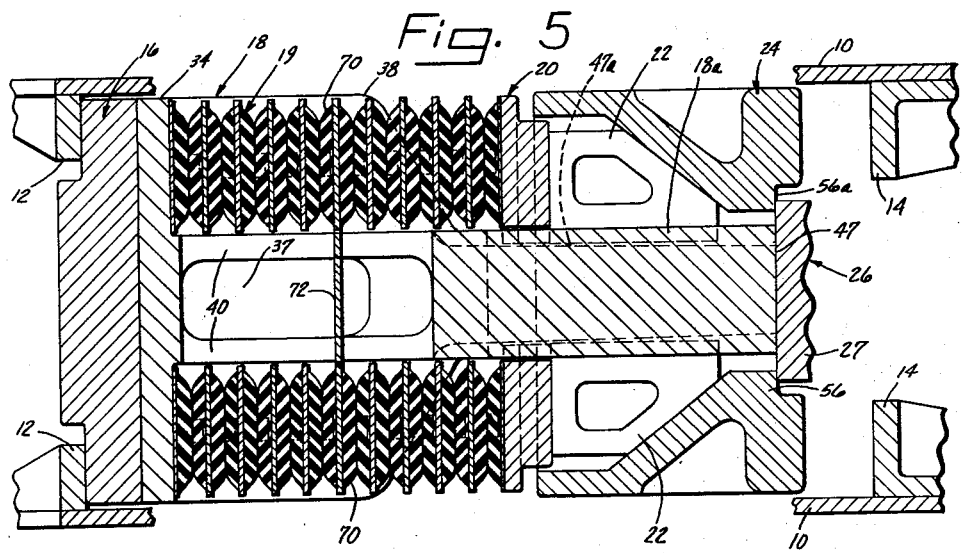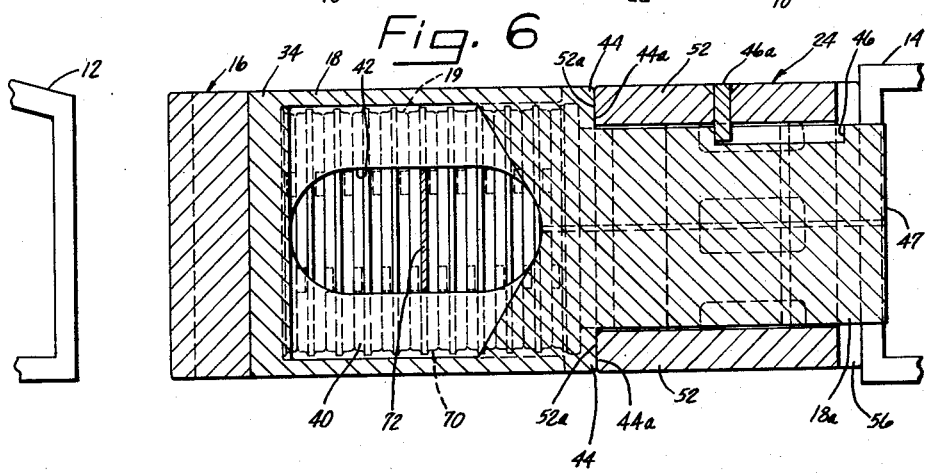

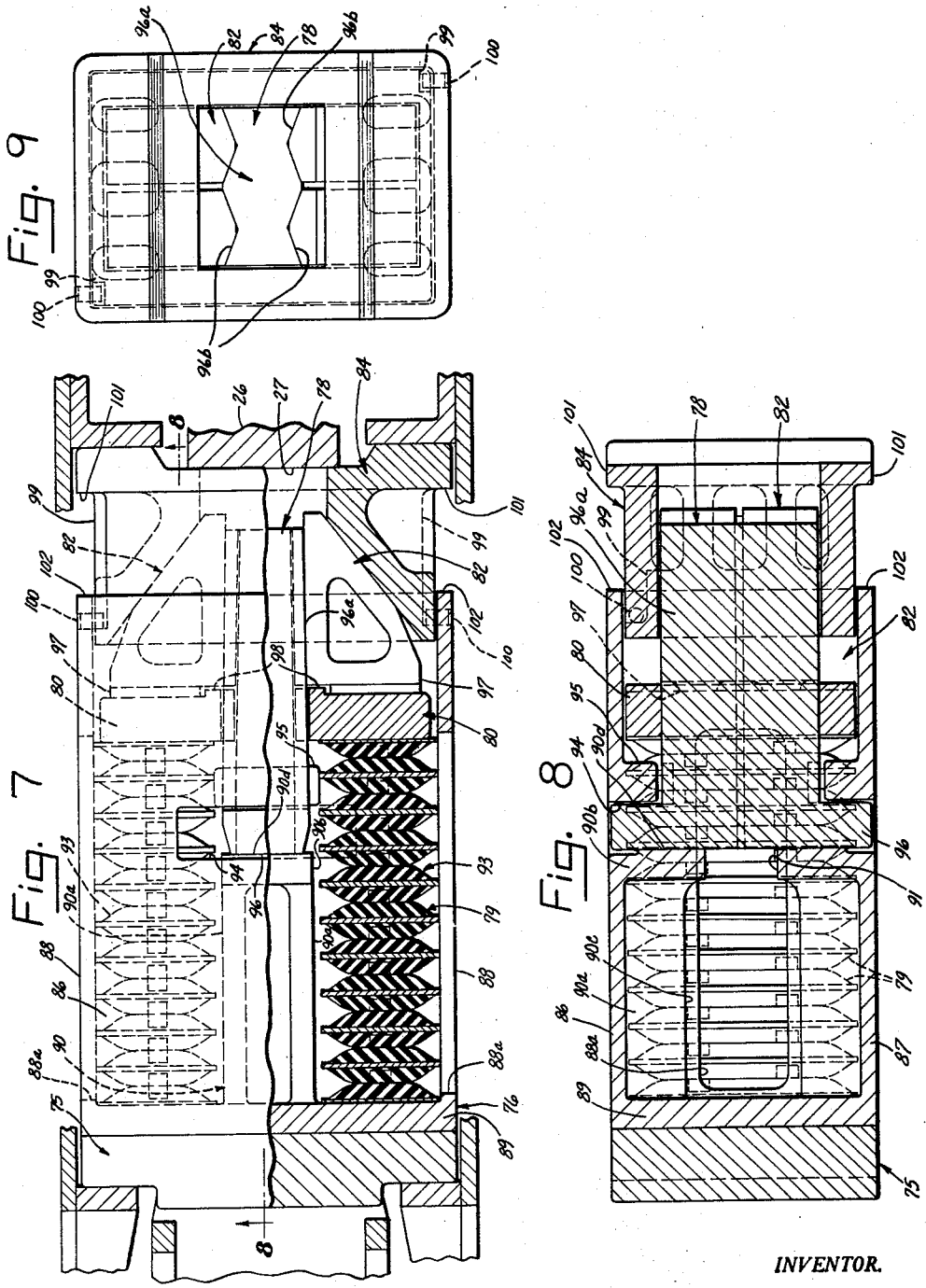

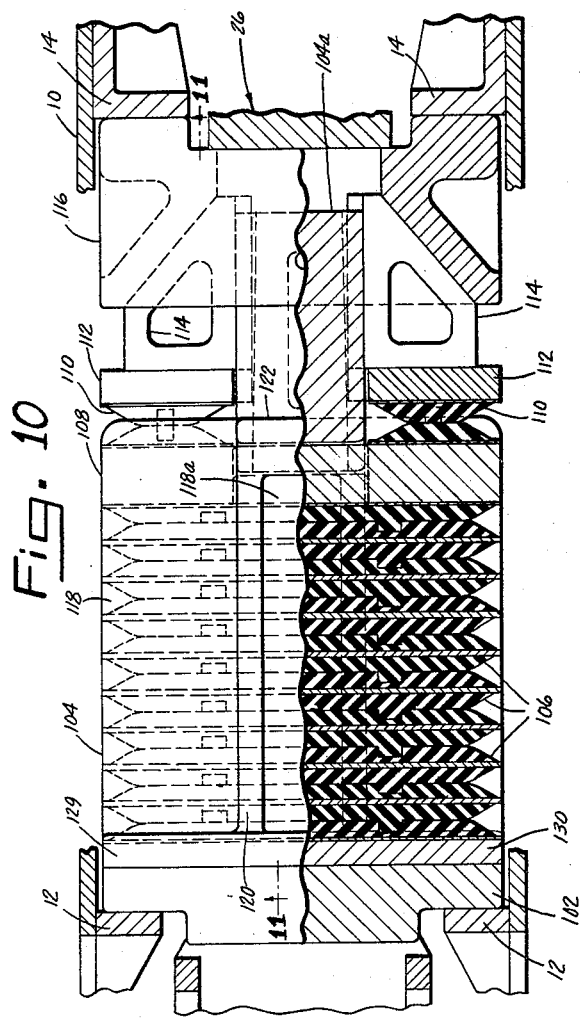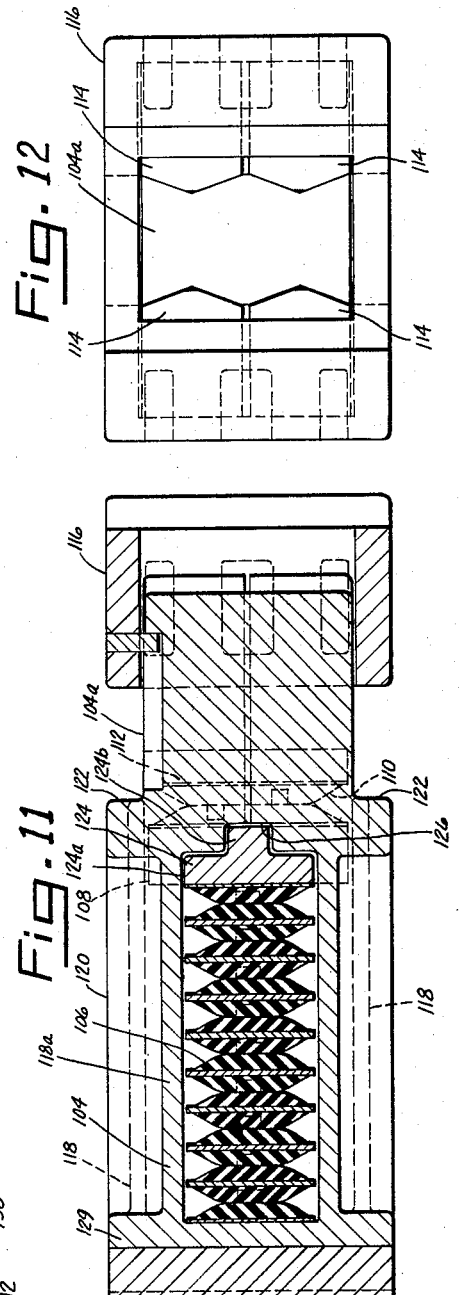

3,008,588
CUSHIONING MECHANISM
Donald Willison, Lyndhurst, Ohio, assignor to National Castings Company, a corporation of Ohio
Filed June 29, 1959, Ser. No. 823,616
9 Claims. (Cl. 213—36)

This invention relates to shock absorbing or cushioning mechanisms, and more particularly to a combined friction and spring cushioning mechanism for railway vehicles.

One object of the invention is to provide a cushioning mechanism comprising a plurality of friction elements including a central friction post in combination with rubber cushioning means.

Another object of the invention is to provide a self-contained shock absorbing mechanism for use in railway vehicles comprising a centrally disposed friction column, resilient cushioning means associated with the column, and a plurality of friction elements disposed generally adjacent the column and adapted for sliding frictional engagement therewith upon operation of the mechanism.

A further object of the invention is to provide a mechanism of the above mentioned type, comprising means for providing greater movement of the cushioning mechanism in buff than in draft.

A more specific object of the invention is to provide a casing type self-contained draft gear for railway vehicles comprising a centrally disposed, longitudinally extending friction column, a plurality of friction shoes frictionally engaging the column, a wedge follower for urging the shoes into frictional engagement with the column, and a plurality of rubber cushioning pads disposed adjacent the column and adapted to cushion the buff and draft forces applied to the draft gear and to activate the friction shoes, and to facilitate releasing of the friction shoes after the latter mentioned forces are removed, and including abutment means for providing greater travel of the gear in buff than in draft.

The various features and advantages of the invention will be apparent from the following description taken in conjunction with the drawings in which:

FIG. 1 is a plan view, partly in section, of the cushioning mechanism applied to conventional car underframe structure.

FIG. 2 is a vertical sectional view taken along line 2—2 of FIG. 1.

FIG. 3 is an end elevational view of the shock absorbing mechanism taken from the right in FIG. 1.

FIG. 4 is a vertical sectional view taken along line 4—4 of FIG. 1.

FIG. 5 is a sectional plan view illustrating the maximum compression of the mechanism upon application of a draft force.

FIG. 6 is a vertical sectional view illustrating the maximum compression of the mechanism upon application of a buffing force.

FIG. 7 is a plan view, partly in section, illustrating a modification of the invention.

FIG. 8 is a vertical sectional view taken generally along line 8—8 of FIG. 7.

FIG. 9 is an end elevational view of the modification of the invention taken from the right in FIG. 7.

FIG. 10 is a plan view, partly in section, illustrating a further modification of the invention.

FIG. 11 is a vertical sectional view taken generally along line 11—11 of FIG. 10.

FIG. 12 is an end elevational view taken from the right in FIG. 11.

Referring to FIGS. 1 to 6, inclusive, of the drawings there is shown the conventional railway vehicle underframe structure comprising center sills 10—10 having front stop lugs 12—12 and rear stop lugs 14—14 defining therewith a draft gear pocket.

The shock absorbing mechanism or draft gear broadly comprises a front follower 16, a casing or housing member 18 having an integral central friction column 18a, rubber cushioning elements 19, intermediate spring plate followers 20, friction shoes 22, and wedge follower member 24. Encircling the draft gear is a draft gear yoke 26 (FIG. 1) comprising the usual top and bottom straps connected at their rearward ends by a vertical abutment portion 27 and at their forward ends by yoke head portion 28. Yoke 26 may be of any conventional type and is adapted to be suitably attached to the usual car coupler (not shown).

Front follower 16 comprises lateral portions 30 adapted for engagement with front stop lugs 12—12 and a forwardly extending abutment portion 32.

Housing member 18 comprises the aforementioned centrally disposed friction column portion 18a and base portion 34 which is adapted for full surface-to-surface engagement with follower 16. It will be understood that member 18 and follower 16 may be formed as an integral unit, if so desired. The forward portion of column 18a has been cored out, as at 37, to form a hollow section comprising top and bottom walls 38 and side walls 40. Each of walls 40 is provided with an oblong opening 42 therein (FIG. 2) for a purpose to be hereinafter described. The lateral extremities of top and bottom walls 38 have been widened to substantially the full transverse extent of base portion 34 of member 18 to provide supporting and guide means for the rubber cushioning elements 19. At their rearward ends, the widened portions of walls 38 converge toward the longitudinal center line of the mechanism and merge with the solid portion of friction column 18a, thereby strengthening the latter member.

Adjacent the latter mentioned mergence of top and bottom walls 38 with the column, the top and bottom surfaces of the latter, in accordance with the invention, are cut away as at 44 (FIGS. 1 and 2) to form top and bottom shoulders 44a on the column. Shoulders 44a are adapted for engagement with abutments 52a on wedge follower 24 to limit travel of the mechanism in buff, as will be hereinafter described. A slot 46 is centrally located in the top of column 18a adjacent its rearward end and is adapted to receive a pin 46a therein for a purpose to be hereinafter described.

In accordance with the invention, the rearwardly facing end surface 47 of friction column 18a provides an abutment for engagement with end portion 27 of yoke 26 to limit the travel of the mechanism in draft, as will be hereinafter described.

The sides of the solid portion of the column comprise V-shaped, generally flat friction surfaces 47a (FIG. 3) adapted for engagement with complementary surfaces on the aforementioned friction shoes 22. Surfaces 47a preferably extend the full longitudinal extent of the solid portion of the column and in the embodiment shown comprise a pair of V-shaped surfaces on each side of the column. Surfaces 47a are tapered, which in effect, progressively varies the thickness of the solid portion of member 18 with the area of least thickness occurring immediately adjacent the end surface 47. In this manner the frictional resistance between the shoes and column are increased upon operation of the mechanism. Furthermore, the uppermost of V-shaped surfaces 47a are preferably tapered at a different degree of angularity than are the lowermost of surfaces 47a in order to provide for differential frictional resistance during operation of the mechanism.

Each of the friction shoes 22 is provided with a pair of angularly disposed, flat friction surfaces 48 (FIGS. 3 and 4) on their inner sides for slidable frictional engagement with the corresponding friction surfaces 47a on the column. Each shoe is also provided with a substantially flat, outer wedge face 49 sloping rearwardly toward the longitudinal axis of the mechanism and adapted to cooperate with a corresponding wedge face on the wedge follower member 24. The forward ends of the shoes have abutment surfaces 50 (FIG. 1) adapted for engagement with one of the associated spring plate followers 20.

Wedge follower 24 is of hollow, box-like construction, comprising top and bottom walls 52, side walls 54, and transverse end wall 56. In addition, follower 24 has rearwardly converging, inclined wedge faces 54a for engagement with the aforementioned complementary wedge faces 49 on friction shoes 22. The engaging surfaces 54a and 49 on the wedge follower 24 and the shoes 22 may, on opposite sides of the friction column 18a, be sloped rearwardly at slightly different angles in order to produce a differential pressure during relative movement between the shoes and the friction column to thus produce a smoother acting friction arrangement for the mechanism. End wall 56 of follower 24 is adapted for engagement with the rear stop lugs 14—14 of the draft gear pocket and has a centrally recessed yoke engaging section 56a. In accordance with the invention, an opening 58 extends through section 56a and is adapted to receive the column member 18a upon operation of the mechanism, as will be hereinafter described. Webs 60 strengthen side walls 54 of the wedge follower against bursting stresses.

Spring plate follower members 20 are generally rectangular in shape and each comprises a base portion 62 and a rearwardly projecting abutment portion 62a which is adapted for engagement with the aforementioned opposing front abutment surfaces 50 on the associated friction shoes (FIG. 1). The top, bottom, and outer side of base portion 62 of each of followers 20 extends beyond the corresponding extremities of abutment portion 62a of the follower (FIGS. 1 and 2), the latter portion being received in the open, forward end of wedge follower 24 to aid in maintaining followers 20 in assembled relationship in the mechanism. The inner side of each of followers 20 has a V-shaped configuration generally similar to the configuration of friction surfaces 47a on the column to thus aid in guiding followers 20 during operation of the mechanism.

Disposed between the front surface of each of followers 20 and the rear surface of transverse wall 34 of housing member 18 on opposite sides of friction column 18a are the aforementioned rubber cushioning elements 19. Each of elements 19 preferably comprises a metal plate 65 to which are bonded rubber cushions 67 to opposite sides thereof. Each group or column of pads terminates in end pads 68 which have rubber bonded to one face only, thus avoiding any metal-to-rubber contact at the working faces of the end pads. Each pad on one side thereof comprises a projection and on the other side thereof a recess for receiving the projection on the adjacent pad to thus interlock the pads together and maintain them in assembled relationship. This dowel and recess construction has been disclosed and claimed in United States Letters Patent No. 2,686,667, dated August 17, 1954, to Donald Willison and Hubert L. Spence. The central pad 70 of each of the columns of cushioning elements is joined to the central pad in the column on the opposite side of the friction column 18a by means of a metal web 72 (FIG. 1) which extends through the aforementioned openings 42 in side walls 40 of the hollow portion of the friction member and thus maintains the stability of the columns of pads during operation of the mechanism. Web 72 may either be formed integrally with central pads 70 during manufacture thereof, or it may be subsequently inserted between the metal plates of the pads and rubber cushions 67. It will be seen that connecting web 72 not only maintains the lateral stability of the groups of pads, but also their vertical stability, by engagement of the web with the upper and lower extremities of openings 42 in side walls 40 of the cored out portion 37 of the friction column. Thus web 72 aids in preventing destructive rubbing of pads 19 against the inner surfaces of top and bottom walls 38 on the casing during operation of the mechanism.

The assembly of the cushioning mechanism is preferably as follows: Housing member 18 is disposed in a vertical position and the central pad 70 of each of the groups of resilient cushioning elements with the middle web 72 fastening pads 70 together as a unit, are placed in a vertical position and passed through elongated openings 42 in the side walls 40 of friction column member 18a. Pads 70 as a unit are then rotated 90° into substantially horizontal position and the other rubber pads of each of the groups on opposite sides of friction column 18a are inserted into proper position with the dowels in each of the pads being received in the recess in the adjacent pad. It will be seen that pads 19 are easily inserted through the open sides of housing member 18. Spring plate follower 20 is then placed on the top of each of its associated group of pads and the open front end of follower 24 with the wedge shoes 22 assembled therein is slipped over the top of friction column 18a.

A compressing force is then applied to wedge follower 24 by any suitable means, thereby moving wedge follower 24, friction shoes 22, and spring plate followers 20 inwardly to compress resilient pads 19 a predetermined amount. The aforementioned pin 46a is then driven through an opening in the top of wedge follower 24, and is received in the aforementioned slot 46 in friction column 18a. Pin 46a is welded in place to maintain it in assembled position. In this connection, the rearward end of slot 46 is adapted to receive a slug or block of crushable material (i.e. lead—not shown) so as to temporarily maintain the draft gear in sufficiently compressed condition to readily enable insertion of the latter into the draft gear yoke and draft gear pocket of the car. Upon release of the compressive force, the resilient pads 19 expand, thereby moving wedge follower 24 outwardly until pin 46a engages the aforementioned crushable slug in the rearward end of slot 46. In this condition the mechanism is self-contained and can be stored or shipped as a unit without the necessity of any other means to maintain it in assembled condition. Slot 46 is of sufficient longitudinal extent that no interference occurs between the forward end of the slot and pin 46a upon operation of the mechanism.

To assemble the draft gear into a yoke and draft gear pocket of a railway vehicle, the mechanism is merely inserted laterally between the straps of the yoke, followed by the insertion of front follower 16. It will be understood that the aforementioned crushable slug and pin 46a maintain the draft gear in sufficiently compressed condition that the longitudinal spacing between the yoke engaging portion 56a on follower 24 and the front abutment portion 32 on follower 16 is such that the mechanism can be freely moved into place between the rear abutment portion 27 and the front head portion 28 of the yoke 26. The cushioning mechanism and yoke assembly may then be raised upwardly into the pocket of the car, between front and rear stop lugs 12 and 14.

The aforementioned crushable slug and pin 46a maintain the mechanism in sufficiently compressed condition so that it slides easily into place between front and rear stop lugs of the draft gear pocket. A support plate is then suitably attached to the underside of the center sills 10—10 to maintain the cushioning mechanism in assembled condition in the pocket of the car.

Next, the coupler shank is attached to the head portion 28 of the yoke in the usual manner and successive buffing and draft forces are applied to the coupler, thereby causing the crushable slug to crush out from the rearward end of slot 46. Thereupon the resilient cushioning elements 19 expand forcing front follower 16 tightly against front stop lugs 12—12 and rear wedge follower 24 tightly against rear stop lugs 14—14. With the shock absorbing mechanism in neutral position, as shown in FIGS. 1 and 2, resilient means 19 is subjected to an initial compression of approximately 5,000 pounds.

Disassembly of the draft gear is effected by removing the support plate and generally reversing the above described procedure.

The operation of the cushioning mechanism is as follows: Under a pulling or draft load, the coupler shank transmits the load through the yoke, and particularly the rear portion 27 thereof, to wedge follower 24 causing it to move forwardly after the initial compression of resilient elements 19 and the static frictional resistance between friction shoes 22 and friction column 18a are overcome. It will be seen that the engagement between front follower 16 and front stop lugs 12—12 prevents any forward movement of the housing member 18 and associated friction column 18a in draft. Accordingly, in draft, the friction resistance between moving shoes 22 and surfaces 47a on stationary friction column 18a, together with the resistance to compression of resilient cushioning elements 19, opposes the forward movement of the yoke.

In accordance with the invention, as the draft force causes wedge follower 24 to move forwardly, the rearward end of friction column 18a passes through opening 58 in end wall 56 of the follower and eventually engages vertical abutment portion 27 of the yoke, as shown in FIG. 5, to limit travel of the mechanism in draft. In the embodiment shown, the maximum travel of the mechanism in draft is approximately 2¼ inches.

When a buffing load is applied to the coupler, the rear surface of the coupler shank transmits the load to front follower 16. When the buffing load exceeds the initial precompression of resilient elements 19 and the static frictional resistance between friction shoes 22 and friction surfaces 47a on the friction column 18a, the latter are caused to move rearwardly together with front follower 16, thereby compressing resilient means 19 and producing sliding frictional resistance between friction surfaces 48 on the shoes and surfaces 47a on friction column 18a.

It will be seen that during buffing operations the spring plate followers 20, friction shoes 22, and wedge follower 24 do not move but are held substantially stationary by the engagement of the wedge follower with rear stop lugs 14—14. As front follower 16 and housing member 18 move rearwardly, friction column 18a of member 18 passes through opening 58 in end wall 56 of wedge follower 24 to engage rear abutment portion 27 of yoke 26. Thereafter, the front follower 16, housing member 18 and yoke 26 move rearwardly as a unit until rearwardly-facing abutment shoulders 44a on the top and bottom of column portion 18a (FIGS. 1 and 2) engage the front abutment surfaces 52a of the top and bottom walls 52 of wedge follower 24, as shown in FIG. 6. This represents the maximum travel of the mechanism in buff. The maximum travel of the draft gear in buff is approximately 3¼ inches in the embodiment shown.

Upon removal of the buff or draft forces applied to the mechanism, the rubber cushioning elements 19 expand to return the parts of the mechanism to their neutral position (FIGS. 1 and 2.)

It will be understood that the purpose of the aforementioned forward abutment portion 32 on front follower 16 and the recessed portion 56a of end wall 56 of wedge follower 24 is to move the coupler forwardly to allow greater clearance between the coupler horn and the front abutment surface of the underframe structure of the vehicle to utilize the greater travel of the draft gear in buff.

It will be seen from FIGS. 5 and 6 that the aforementioned web 72 connecting central pads 70 of each of the laterally positioned groups of cushioning elements 19, in combination with the aforementioned dowel and recessed construction of the pads, prevents the groups or columns of resilient elements 19 from buckling during operation of the mechanism in buff and draft, and thus maintains the columnar stability of the mechanism.

Referring to FIGS. 7 to 9, inclusive, of the drawings there is shown a modified form of the invention disposed in the draft gear pocket of conventional railway vehicle underframe structure. The latter structure and the yoke 26 are of similar construction as the corresponding parts of the first-described embodiment of the invention.

The cushioning mechanism of the modification broadly comprises a front follower 75, a casing member 76 embodying a removable, centrally positioned friction column 78, rubber cushioning elements 79, which are generally similar to the cushioning elements of the first-described embodiment of the invention, intermediate spring plate followers 80 disposed on opposite sides of friction column 78, friction shoes 82, and a wedge follower member 84.

Front follower 75 is generally identical to the front follower 16 of the first described embodiment of the invention.

Casing member 76 is of hollow, box-like construction comprising horizontally disposed, vertically spaced top and bottom walls 86 and 87, side walls 88, and front transverse end wall 89 connecting the side, top and bottom walls to form an enclosure for housing resilient elements 79. Side walls 88 have longitudinally extending openings 88a therein for lightening the casing.

A centrally disposed abutment portion 90 projects rearwardly from front transverse end wall 89 and comprises side walls 90a extending between top and bottom walls 86 and 87 of casing member 76, and end wall 90b which is provided in its central portion with an opening 91 for the purpose of lightening the structure.

Each of side walls 90a is provided with an oblong opening 90c therein which merges with opening 91 in end wall 90b and is also for the purpose of lightening the structure. End wall 90b of portion 90 comprises rearwardly facing abutment surfaces 90d adapted for engagement with the front end of detachable friction column 78. Each of top and bottom walls 86 and 87 of member 76 is provided with an opening 94 therein disposed generally rearwardly of abutment portion 90 for a purpose to be hereinafter described.

Projecting inwardly from the top and bottom walls 86 and 87 of member 76, generally immediately rearwardly of openings 94, are retaining lugs 95 which are adapted to maintain friction column 78 in assembled position, as will be hereinafter further discussed.

Detachable friction column 78 comprises a vertically extending abutment wall 96 adapted for engagement with the aforementioned abutment surfaces 90d on end wall 90b of abutment portion 90 and a longitudinally extending friction portion 96a. Friction column 96a comprises longitudinally extending V-shaped friction surfaces 96b which are tapered and adapted for engagement with complementary surfaces on friction shoes 82 in a manner similar to the first described embodiment of this invention.

Friction shoes 82 and spring plate followers 80 are generally similar to the corresponding parts of the first described embodiment except that the shoes comprise abutment portions 97 which are adapted to be received in overlapping relationship with rearwardly extending lug portions 98 on spring follower members 80 to aid in maintaining followers 80 in assembled relationship during operation of the mechanism.

Wedge follower member 84 is generally similar to the corresponding member of the first described embodiment of the invention except that it comprises longitudinally extending slots 99 disposed generally on diagonally opposite lateral corners of the member. Pins 100 projecting inwardly through side walls 88 of casing member 76 are adapted to extend into slots 99 and engage the forward ends thereof to maintain the mechanism in assembled condition as a self-contained unit. Slots 99 are of sufficient longitudinal extent that no interference occurs between the rearward ends of the slots and the pins upon operation of the mechanism.

Assembly of the modified cushioning mechanism is preferably as follows:

The removable friction column 78 is inserted through the open end of casing 76 into engagement with surface 90d of abutment portion 90 of the casing with the abutment wall 96 of column 78 being disposed in a generally horizontally extending position. Column 78 is then rotated approximately 90 degrees whereby wall 96 is moved into a generally vertically extending position. In the latter position it will be seen that the upper and lower portions of wall 96 extend into openings 94 in top and bottom walls 86 and 87 of casing 76 between abutment surfaces 90d on end wall 90b and retaining lugs 95, to thus interlock the friction column and the casing member. The groups or columns of cushioning pads 79 are then disposed, as shown, on opposite sides of the casing and the spring followers 80, friction shoes 82 and wedge follower 84 are assembled into proper position as shown. A compressing force is then applied to the wedge follower by any suitable means to thereby move wedge follower 84, friction shoes 82 and spring plate followers 80 inwardly of the casing to compress the resilient pads 79 a predetermined amount. Pins 100 are then inserted through openings in side walls 88 of the casing and are received in the aforementioned slots 99 in the wedge follower. Pins 100 are preferably welded in place to maintain them in assembled position. In this connection, the forward ends of slots 99 are provided with crushable slugs (not shown) for a similar purpose as in the first described embodiment of the invention. Upon release of the compressive force, pads 79 expand thereby moving wedge 84 outwardly of the casing until the pins engage the aforementioned crushable slugs in the forward ends of slots 100. The modification of the invention is thus also self-contained and may be stored or shipped as a unit without the necessity of any other means to maintain it in assembled condition.

Assembly of the modified gear into a yoke and draft gear pocket of a railway vehicle and its operation in service is substantially identical to that of the first-described embodiment of the invention.

In this connection, it will be understood that shoulders 101 extending outwardly from the rearward portion of wedge member 84 are adapted for engagement with rearwardly facing abutment surfaces 102 on casing member 76 to limit travel of the mechanism in buff. In draft, travel of the mechanism is limited by the engagement of the yoke abutment portion 27 with the rearward end of removable friction column 78 in a manner similar to the first described embodiment of the invention.

It will be observed that the columns of pads do not need any connecting web as in the first-described embodiment of the invention to maintain the columnar stability of the groups, since side walls 88 of the casing guide the longitudinal movement of the pads and maintain them in proper position.

The detachable feature of the friction column in the modification of the draft gear enables replacement of the part that receives the greatest wear in service without the necessity of replacing the whole casing member, thus providing a more economically maintained draft gear. Furthermore, the detachable feature of the friction column 78 simplifies the molding of the parts of the gear and provides an easier handled mechanism during manufacture.

Referring to FIGS. 10 to 12, inclusive, of the drawings, there is shown a further modified form of the invention disposed in the draft gear pocket of conventional railway vehicle underframe structure. The cushioning mechanism of this modification broadly comprises a front follower 102, a casing member 104 having an integral central friction column 104a, rubber cushioning elements 106 which extend transversely to substantially the full width of the mechanism, a transverse separating follower 108, rubber cushioning elements 110 which are similar to the corresponding elements of the prior described embodiments of the invention and are disposed on opposite sides of friction column 104a, spring plate followers 112, friction shoes 114 and wedge follower member 116.

Front follower 102 is generally similar to the corresponding follower of the prior described embodiments of the invention. Casing member 104 is also generally similar to the casing member 18 of the first described embodiment of the invention except that top and bottom walls 118 have been offset vertically inwardly from the top and bottom walls 129 of base portion 130 to lighten the member with the central portions 118a thereof being offset a greater amount to form seats for, and to guide the movement of cushioning elements 106 during operation of the mechanism.

Cushioning pads or elements 106 are generally similar to the cushioning pads of the prior described embodiments of the invention, except that they extend transversely to substantially the full width of the mechanism and are reduced in height as compared to the corresponding prior described pads. It will be understood that the use of a smaller height pad for elements 106, as compared to the prior described arrangements, is permissible since pads 106 extend substantially the full transverse extent of the mechanism and thus provide sufficient capacity for the draft gear even though reduced in height. Webs 120 strengthen walls 118 against bending stresses and terminate into, as well as reinforce top and bottom abutment shoulders 122 on the casing member. Shoulders 122 are adapted for engagement with abutments on wedge member 116 to limit travel of the mechanism in buff in a similar manner as the first described embodiment of the invention. Separating follower 108 extends transversely between top and bottom walls 118 of casing member 104 and comprises a central portion 124 which is notched as at 124a on the top and bottom thereof so as to be received between the top and bottom walls of offset portions 118a of the casing member. The rearward side of portion 124 of follower 108 embodies a rearwardly extending lug portion 124b which is received in a forwardly facing recess 126 (FIG. 11) in the forward end of friction column 104a of the casing member.

Spring plate follower members 112, friction shoes 114 and wedge follower 116 are generally similar to the first described embodiment of the invention.

Assembly of the FIGS. 10-12 draft gear arrangement into a yoke and draft gear pocket of a railway vehicle and its operation in service is substantially similar to the first described embodiment of the invention. In this connection it will be noted that pin and slot means associated with the friction column 104a of the casing member 118 and the wedge follower member 116 maintains the cushioning mechanism in assembled condition as a self-contained unit in a similar manner as in the first described embodiment of the invention.

It will also be noted that the individual rubber cushioning elements 110 on opposite sides of the friction column 104a provide for greater flexibility between spring plate followers 112 and friction shoes 114 and between the latter and column 104a, than if pads 110 extended the full width of the mechanism. Thus shoes 114 will be better able to seat themselves for overall frictional engagement with friction column 104a during operation of the draft gear mechanism in the event the coupler and associated yoke is angled from a longitudinally aligned position during such operation.

From the foregoing description and accompanying drawings it will be readily understood that the invention provides novel combined friction and spring cushioning mechanism of the self-contained type comprising a centrally located friction column in combination with rubber cushioning elements and including abutment means for providing greater travel of the mechanism in buff than in draft.

The terms and expressions which have been employed are used as terms of description and not of limitation and there is no intention of excluding such equivalents of the invention described or of the portions thereof as fall within the purview of the claims.

What is claimed is:

1. In a friction shock absorbing mechanism, a casing member comprising a transversely extending base portion and a longitudinally extending friction column, friction shoes complementally engaging longitudinal surfaces on said column, a resilient cushioning element disposed between said base portion and said shoes and reacting therebetween, a wedge follower encircling said shoes in wedging relation therewith, a longitudinally extending opening in said follower, said column terminating in an end surface disposed, at an extended condition of said mechanism, inwardly of said opening, and adapted to engage associated abutment means located exteriorly of said opening, said cushioning element comprising two groups of individual rubber-like pads disposed on opposite sides of said friction column.

2. The friction shock absorbing mechanism of claim 1 further characterized by the fact that the said two groups of rubber-like pads are connected together by a transverse web extending through a transverse opening in said friction column.

3. In a friction shock absorbing mechanism, a casing member comprising a transversely extending base portion and a longitudinally extending friction column, friction shoes complementally engaging longitudinal surfaces on said column, a resilient cushioning element disposed between said base portion and said shoes and reacting therebetween, a wedge follower encircling said shoes in wedging relation therewith, a longitudinally extending opening in said follower, said friction column terminating in an end surface disposed, at an extended condition of said mechanism, inwardly of said opening, and adapted to engage associated abutment means located exteriorly of said opening, said cushioning element comprising a group of individual rubber-like pads, said group extending transversely the full width of said mechanism.

4. In a friction shock absorbing mechanism, a casing member comprising top and bottom walls, a transversely extending base portion and a releasably connected longitudinally extending friction column, an abutment post integral with and extending longitudinally from said base portion, lugs extending inwardly from said top and bottom walls, friction shoes complementally engaging longitudinal surfaces on said column, a resilient cushioning element disposed between said base portion and said shoes and reacting therebetween, a wedge follower encircling said friction shoes in wedging relation therewith, said lugs retaining said friction column in abutting relationship with said abutment post when said mechanism is in operative condition.

5. The friction shock absorbing mechanism of claim 4 further characterized by the fact that said casing member and said wedge follower are in overlapping relationship, said follower having a longitudinally extending slot to receive a pin passed through said wedge follower to retain said mechanism in assembled condition.

6. The friction shock absorbing mechanism of claim 4 further characterized by the fact that said casing member and said wedge follower are in overlapping relationship.

7. In a friction shock absorbing mechanism, a casing member comprising a transversely extending base portion and a longitudinally extending friction column, friction shoes complementally engaging longitudinal surfaces on said column, said friction column having tapered V-shaped friction surfaces, said V-shaped surfaces tapering rearwardly at different degrees of angularity, a resilient cushioning element disposed between said base portion and said shoes and reacting therebetween, a wedge follower encircling said shoes in wedging relation therewith, a longitudinally extending opening in said wedge follower, said friction column terminating in an end surface disposed, at an extended condition of said mechanism, inwardly of said opening, and adapted to engage associated abutment means located exteriorly of said opening to limit movement of said mechanism in one longitudinal direction.

8. The friction shock absorbing mechanism of claim 7 further characterized by the fact that said friction surfaces are tapered in a longitudinal and transverse direction.

9. In a friction shock absorbing mechanism, a casing member comprising a transversely extending base portion and a longitudinally extending friction column, said friction column having V-shaped rearwardly tapering friction surfaces, said V-shaped surfaces tapering rearwardly at different degrees of angularity, friction shoes complementally engaging longitudinal surfaces on said column, a resilient cushioning element disposed between said base portion and said shoes and reacting therebetween, a wedge follower encircling said shoes in wedging relation therewith, a longitudinally extending opening in said wedge follower, said friction column terminating in an end surface disposed, at an extended condition of said mechanism, inwardly of said opening, and adapted to engage associated abutment means located exteriorly of said opening, said friction column intermediate its ends having abutment shoulders thereon, and said wedge follower having corresponding abutment surfaces adapted for engagement with said shoulders to limit longitudinal movement of said column.

References Cited in the file of this patent

UNITED STATES PATENTS

| | | |
|---|---|---|
| 1,033,212 | Taylor | July 23, 1912 |
| 1,163,735 | Brooks | Dec. 14, 1915 |
| 1,637,070 | Brenne | July 26, 1927 |
| 1,653,988 | Blackmore | Dec. 27, 1927 |
| 1,689,449 | O'Connor | Oct. 30, 1928 |
| 1,696,478 | Hall | Dec. 25, 1928 |
| 1,747,238 | Gross | Feb. 18, 1930 |
| 1,846,495 | Lewis | Feb. 23, 1932 |
| 1,882,838 | Haseltine | Oct. 18, 1932 |
| 1,989,157 | Schmidt | Jan. 29, 1935 |